United States Patent [19]

Gotou et al.

[11] Patent Number: 4,878,165

[45] Date of Patent: Oct. 31, 1989

[54] CONTROL SYSTEM WITH IMPROVED ROBUSTNESS TO DISTURBANCES

[75] Inventors: Makoto Gotou, Nishinomiya; Shigeaki Matsubayashi, Sakai, both of Japan

[73] Assignee: Matsushita Electric Industrial Co., Ltd., Osaka, Japan

[21] Appl. No.: 30,610

[22] Filed: Mar. 27, 1987

[30] Foreign Application Priority Data

Mar. 31, 1986 [JP]  Japan .................................. 61-73504
Mar. 31, 1986 [JP]  Japan .................................. 61-73575
Apr. 25, 1986 [JP]  Japan .................................. 61-97166

[51] Int. Cl.$^4$ ..................... G05B 13/02; G11B 15/32
[52] U.S. Cl. .................................. 364/158; 364/161; 364/166; 364/174; 318/7
[58] Field of Search ............... 364/158, 161, 166, 174; 318/6, 7, 561, 609, 611, 615, 616, 636, 327; 360/73

[56] References Cited

U.S. PATENT DOCUMENTS

| | | | |
|---|---|---|---|
| 3,798,426 | 3/1974 | Bristol | 364/158 |
| 4,398,227 | 8/1983 | Anderson | 318/7 |
| 4,448,368 | 5/1984 | Skalko | 318/7 |
| 4,497,086 | 2/1985 | Guse et al. | 364/161 |
| 4,497,459 | 2/1985 | Yoshino et al. | 318/7 |
| 4,513,229 | 4/1985 | Kudelski | 318/6 |
| 4,533,991 | 8/1985 | Georgis | 364/174 |
| 4,602,326 | 7/1986 | Kraus | 364/158 |
| 4,620,241 | 10/1986 | Ono | 318/7 |
| 4,698,745 | 10/1987 | Hiroi et al. | 364/158 |

*Primary Examiner*—John R. Lastova
*Attorney, Agent, or Firm*—Wenderoth, Lind & Ponack

[57] ABSTRACT

A control system has a detecting block for obtaining a detected signal corresponding to a controlled variable of a controlled system and a controlling block for supplying the controlled system with a control signal corresponding to the detected signal. The controlling block comprises an error block for producing an error signal corresponding to the detected signal at a detecting block, a memorizing block having a plurality of memorized values corresponding to the error signal, an output block for producing the control signal by mixing the error signal and one or more memorized values of the memorizing block and a adapting block for changing the number of a plurality of memorized values of the memorizing block according to a frequency of fluctuation of a disturbance source. The memorizing block renews the memorized values sequentially and periodically with a value corresponding to a mixed value of the error signal and a set of N memorized values, the N memorized values having been renewed at intervals of L renewing cycle periods, where each of N and L is an integer at least equal to 2.

24 Claims, 5 Drawing Sheets

4,878,165

CONTROL SYSTEM WITH IMPROVED ROBUSTNESS TO DISTURBANCES

BACKGROUND OF THE INVENTION

1. Field of the Invention

This invention relates to a control system, and more particularly, to a control system required to have a good robustness to disturbances, such as a control system for a motor.

2. Description of the Prior Art

In conventional control systems, a PI controller (Proportional-Integral controller) has been widely used in order to improve the robustness to disturbances, or to suppress influences of disturbances. The PI controller can improve the robustness to disturbances more at lower frequency. However, the recent requirement to improve the robustness to disturbances has become more and more severe in some applications. For example, a control system for controlling the speed of a capstan motor in a video tape recorder requires a highly improved robustness to torque disturbances, because the size and the inertia of the capstan motor have been greatly reduced in recent years.

In order to achieve this requirement, one of the inventors of the present invention has proposed a control system with a highly improved robustness to disturbance in U.S. patent application Ser. No. 917498 filed Oct. 10, 1986. This control system comprises a detecting means producing a detected signal corresponding to a controlled variable of a controlled system, an error means producing an error signal corresponding to the detected signal of the detecting means, a memorizing means renewing a plurality of memorized values sequentially and periodically each by a value corresponding to a first mixed value which is obtained by mixing the error signal of the error means and at least a set of N memorized values of the plurality of memorized values, the set of N memorized values having been renewed at intervals of L renewing cycles, where each of N and L is an integer at least equal to 2 and an output means producing a control signal corresponding to a second mixed value which is obtained by mixing the error signal of the error means and one or more memorized values of the memorizing means, and supplying the controlled system with the control signal so as to control the controlled variable of the controlled system.

The control system has good improved robustness to disturbances, especially at the frequencies $k*fe$ ($k=0, 1, 2, \ldots$), where $$fe = 1/(L.Tx)$$

Tx is a time of one renewing or sampling cycle period. However we found that some more improvement is necessary for more severely controlling the speed of a capstan motor in a video tape recorder. More specifically we found that the speed of a capstan motor is greatly influenced by a fluctuation of tape tension due to torque disturbances from a take-up reel (or a supply reel). Furthermore the frequency of the fluctuation of tape tension changes according to the quantity of the tape wound on a take-up reel (or a supply reel).

SUMMARY OF THE INVENTION

It is an object of the present invention to provide a control system with an improved robustness to disturbances even in existance of a fluctuation of a disturbance source.

This object is achieved according to the present invention by providing a control system comprising:

a detecting means producing a detected signal corresponding to a controlled variable of a controlled system;

an error means producing an error signal corresponding to the detected signal of said detecting means;

a memorizing means renewing a plurality of memorized values sequentially and periodically at intervals of a renewing cycle period proportional to a period of the detected signal of the detecting means each by a value corresponding to a first mixed value which is obtained by mixing the error signal of said error means and one or more of said memorized values which are at least an interval of L renewing cycle periods older, where L is an integer at least equal to 2;

an output means producing a control signal corresponding to a second mixed value which is obtained by mixing the error signal of said error means and one or more memorized values of said memorizing means, and supplying said controlled system with the control signal so as to control the controlled variable of said controlled system; and an adapting means changing the number of a plurality of memorized values of said memorizing means which is renewed sequentially and periodically at intervals of a renewing cycle period corresponding to a frequency of fluctuation of a disturbance source.

BRIEF DESCRIPTION OF THE DRAWINGS

The above and other objects, features and advantages of the present invention will become more apparent from the following detailed description taken in connection with the accompanying drawings in which.

DESCRIPTION OF THE PREFERRED EMBODIMENTS

Figure 1:
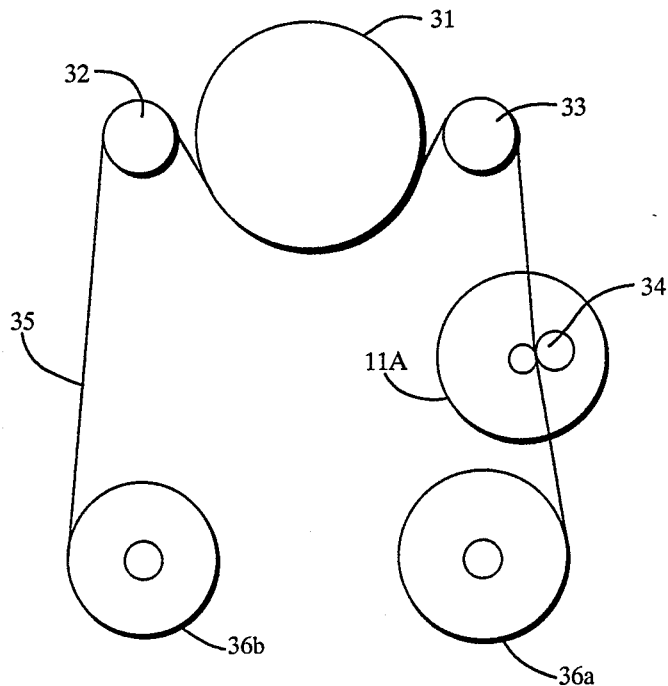
FIG. 1 is a basic constitution of a tape running unit in a video tape recorder.

Referring to FIG. 1, which shows a basic construction of a tape running unit in a video tape recorder, a magnetic tape 35 fed from a supply reel 36b is wound on a rotary cylinder 31 at least 180 degrees by impedance rollers 32 and 33. An information is recorded on or played back from the magnetic tape 35 by a rotary magnetic head (not shown) mounted on the rotary cylinder 31. The magnetic tape 35 is pressed on a shaft of a capstan motor 11A by a pinch roller 34 to run at an aimed speed in proportion to the rotating speed of revolution of the capstan motor 11A and wound on a take-up reel 36a. A tape tension of the magnetic tape 35 fluctuates because of influence from the take-up reel 36a or the supply reel 36b. So, the rotating speed of the capstan motor 11A fluctuates, and therefore the running speed of the magnetic tape 35 fluctuates (wow-flatter). Since the frequency of the tape tension fluctuation is in proportion to the rotating speed of a reel, it is also in proportion to the quantity of the magnetic tape 35 wound on each reel. Accordingly the frequency varies in fairly wide range from the beginning to the end of winding the tape. Especially the take-up reel 36a has a great influence on the fluctuation of the rotating speed of the capstan motor 11A.

Figure 2:
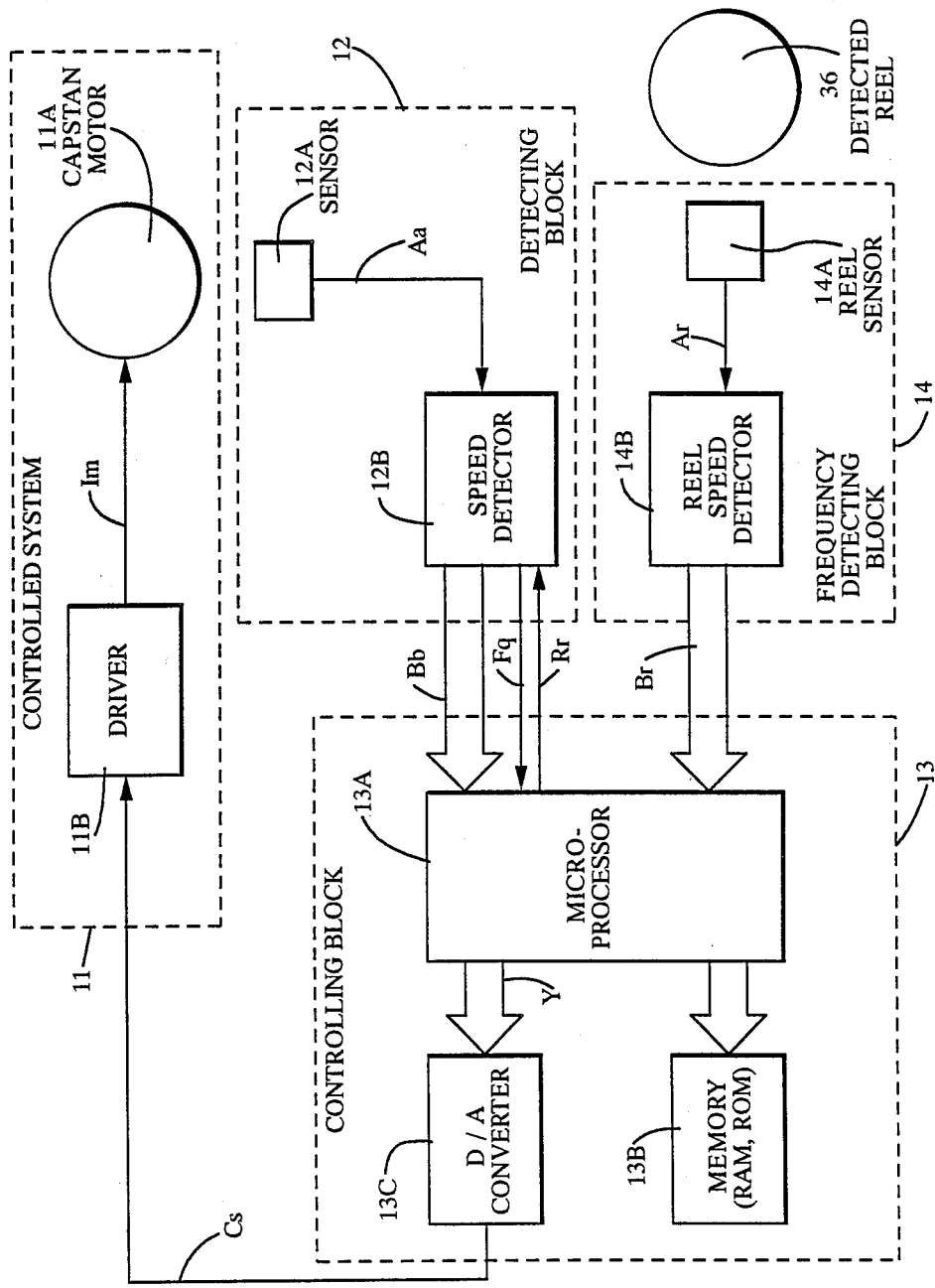
FIG. 2 is a basic block diagram of a control system for controlling the speed of a capstan motor.

FIG. 2 shows a schematic block diagram showing an embodiment of the present invention for controlling the speed of the capstan motor 11A shown in FIG. 1. A controlled system 11 has the capstan motor 11A to be controlled and a driver 11B (a driving means) for supplying the capstan motor 11A with a current Im (a power). The capstan motor 11A is controlled so as to rotate at an aimed speed. A detecting block 12 (a detecting means) has a sensor 12A (a sensing means), a speed detector 12B (a speed detecting means). The sensor 12A produces a sensed signal Aa with a frequency equal to Zq times a rotational frequency fm (Hz) of the capstan motor 11A, where Zq is an integer at least equal to 2. For example, Zq is equal to 357 in the case of a typical capstan motor of a video tape recorder. The speed detector 12B obtains a detected signal Bb and a flag signal Fq at every one or half period of the sensed signal Aa. The detected signal Bb is a digital or coded signal with a digital number corresponding to the one or half period of the sensed signal Aa, that is, the speed of the capstan motor 11A. The flag signal Fq is set to be "H" (a high voltage) at every timing when the speed detector 12B obtains a new detected code or value.

A frequency detecting block 14 (a frequency detecting means) has a reel sensor 14A and a reel speed detector 14B (a reel speed detecting means). The reel sensor 14A produces a sensed signal Ar with a frequency equal to Zr times the rotational frequency fr (Hz) of the detected reel 36 (the take-up reel 36a or the supply reel 36b in FIG. 1), where Zr is an integer at least equal to 2. The reel speed detector 14B obtains a detected signal Br at every one half period of the sensed signal Ar. The detected signal Br is a digital or coded signal with a digital number corresponding to the one or half period of the sensed signal Ar, that is, the speed of the detected reel 36.

The detail construction and operation of the speed detector 12B or the reel speed detector 14B will be described later.

A controlling block 13 (a controlling means) has a microprocessor 13A, a memory 13B including RAM (random access memory) and ROM (read only memory), and a D/A converter 13C. The microprocessor 13A excutes an operation according to instructions stored in the ROM of the memory 13B so that the controlling block 13 inputs the detected signal Bb and supplying the driver 11B of the controlled system 11 with a control signal Cs corresponding to the detected signal Bb. The detail operation of the microprocessor 13A will be described later. The driver 11B supplies the capstan motor 11A with the current Im corresponding to the control signal Cs so as to generate a torque proportional to the control signal Cs.

Thus, a control loop (a speed control loop of the capstan motor 11A) is formed by the controlled system 11 (the capstan motor 11A and the driver 11B), the detecting block 12 (the sensor 12A, the speed detector 12B), the controlling block 13 (the microprocessor 13A, the memory 13B and the D/A converter 13C) and the frequency detecting block 14 (the reel sensor 14A and the reel speed detector 14B), so that the controlled variable of the controlled system 11 (the speed of the capstan motor 11A) is controlled at the aimed value (the aimed speed).

Figure 3:
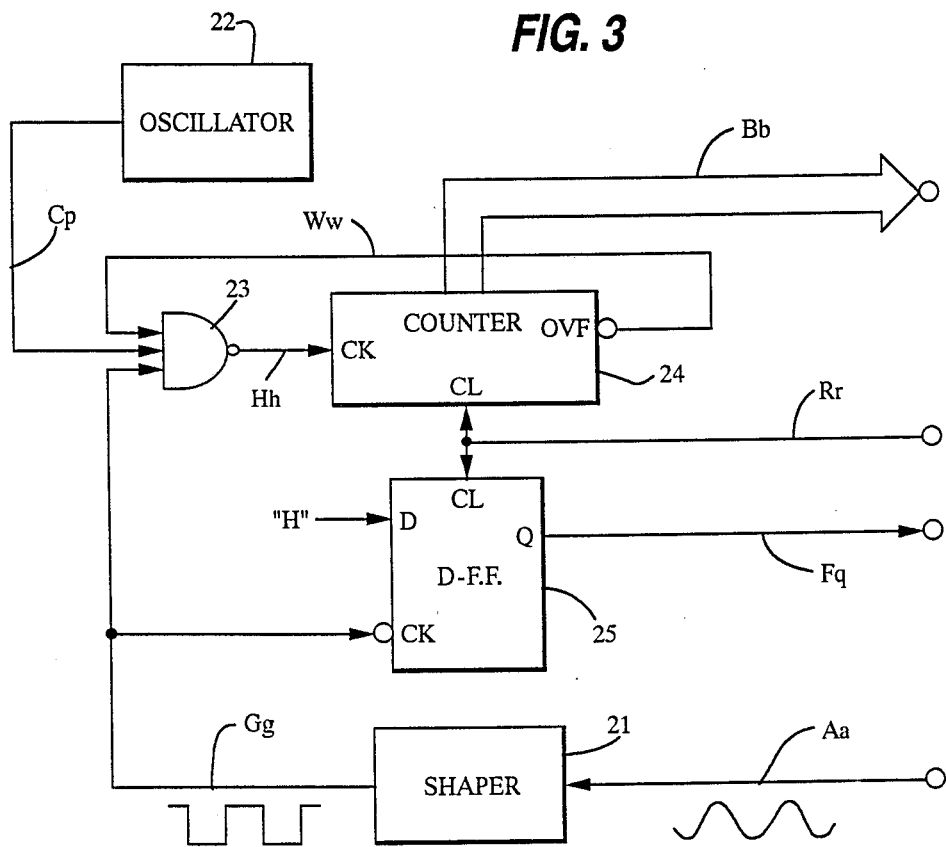
FIG. 3 is a circuit diagram of a speed detector usable in the control system shown in FIG. 2.

A construction of the speed detector 12B will be explained in detail hereinbelow. FIG. 3 shows a construction of the speed detector 12B. A shaper 21 compares the sensed signal Aa with a predetermined voltage and produces a shaped signal Gg with a squared waveform. The shaped signal Gg is applied to an input terminal of an AND circuit 23 and a trigger input terminal CK of a D-type flip-flop 25. A clock pulse signal Cp generated by an oscillator 22 and an overflow signal Ws of a counter 24 are respectively applied to the other input terminals of the AND circuit 23. The oscillator 22 has a crystal oscillator and a frequency divisor, for example, and produces the clock pulse signal Cp with a frequency about 500 kHz, much higher than the frequency of the shaped signal Gg. The counter 24 has a 12 bit length and counts up pulses of an output signal Hh of the AND circuit 23 to obtain the detected signal Bb. The overflow signal Ww of the counter 24 is "H" when the content of the counter 24 (the detected signal Bb) remains below a predetermined value, and turns "L" when the content of the counter 24 becomes equal to or over the predetermined value, where "H" and "L" mean a high voltage (5V) and a low voltage (0 V), respectively. As a data input terminal of the D-type flip-flop 25 is connected to "H", a flag signal Fq, which is an output signal of the D-type flip-flop 25, becomes "H" at every timing of the falling edges of the shaped signal Gg. A reset signal Rr from the controlling block 13 can reset the contents of the counter 24 and the D-type flip-flop 25 so as to make an initial condition of Bb="LLLL LLLL LLLL" and Fq="L".

The operation of the speed detector 12B shown in FIG. 3 will be explained hereinbelow. Assume that the contents of the counter 24 and the D-type flip-flop 25 are reset or at the initial condition and that the shaped signal Gg is "L". After the shaped signal Gg changes from "L" to "H", the counter 24 counts up the output signal Hh of the AND circuit 23 which is the clock pulse signal Cp from the oscillator 22. At the time when the shaped signal Gg changes from "H" to "L", the output signal Hh of the AND circuit 23 becomes "L" and the counter 24 holds the content until the next change of the shaped signal Gg. As the result of this, the held content of the counter 24 is the digital or coded number proportional to the half period of the sensed signal Aa from the sensor 12A, which is inversely proportional to the speed of the capstan motor 11A. The flag signal Fq changes from "L" to "H" at every falling edge of the shaped signal Gg. The controlling block 13 inputs the detected signal Bb, i.e. the held content of the counter 24, after checking the flag signal Fq being "H". Then, the controlling block 13 resets the contents of the counter 24 and the D-type flip-flop 25 by making the reset signal Rr "H" for a short time. This makes the counter 24 and the D-type flip-flop 25 into the initial condition for preparing the next detection. Besides, the held content of the counter 24 can be a large value, when the speed of the capstan motor 11A is very low during the accelerating time.

A construction and the operation of the reel speed detector 14B is almost the same as that of the speed detector 12B except that the D-type flip-flop 25 is not provided.

The operation of the controlling block 13 will be explained in detail hereinbelow, referring to FIG. 4 which shows a flow diagram of the operation of the microprocessor 13A. It is noted that a register name and a content stored in it are designated by a same label hereinbelow. The microprocessor 13A executes the following tasks according to the instructions stored in the ROM of the memory 13B:

(AN ERROR BLOCK 4A (AN ERROR MEANS))

(4a-1) The flag signal Fq is checked until the flag signal Fq becomes "H". That is, the microprocessor 13A is triggered so as to execute the following procedure at the timing when the speed detector 12B obtains a new detected code corresponding to the current speed of the capstan motor 11A.

(4A-2) The detected signal Bb (the held content of the counter 24) is inputted and changed to the digital or coded value S. Then, the contents of the counter 24 and the D-type flip-flop 25 are reset by making the reset signal Rr "H" for a very short time.

(4A-3) A difference value Eo is computed between the detected value S and a predetermined value Sref corresponding to the aimed speed. That is, Eo=Sref−S. Then, an error signal E is obtained by multiplying the difference value Eo with a predetermined positive value R. That is, E=REo. (AN OUTPUT BLOCK 4B (AN OUTPUT MEANS))

(4B-1) An output signal Y is obtained by mixing the error signal E and a composite value V of a composing block 4Cb in a memorizing block 4C, described later, with a ratio of 1:D, where D is a positive real number at most equal to 1.5 and at least equal to 0.25.

(4B-2) The output signal Y is outputted to the D/A converter 13C as the control signal Cs.

(A MEMORIZING BLOCK 4C (A MEMORIZING MEANS))

The memorizing block 4C comprises a renewing block 4Ca and the composing block 4Cb.

<A RENEWING BLOCK 4Ca (A RENEWING MEANS)>

(4Ca-1) A count variable I is incremented with a module number NL, where each of N and L is an integer at least equal to 2 and preferably L is equal to an integral multiple of Zq. That is, 'I=I+1 (MOD NL)' means 'I=I+1 and I=0 if I=NL', because A witha modulo B means the remainder of A/B. Thus, the count variable I varies from 0 to NL−1 and increments its value in a circular form at every detecting timing of the speed detector 12B.

(4Ca-2) A memorized value M(I), stored at the address corresponding to the count variable I in the RAM of the memory 13B, is renewed by a mixed value of the error signal E and the composite value V of the composing block 4Cb with a ratio of 1:1. That is, M(I)=E+V. The renewed memorized value M(I) is held until the next renewing time of M(I), that is, the NL renewing cycles later. As the result of this, the NL memorized values M(0) to M(NL−1) are obtained, and the NL memorized values are sequentially and periodically renewed.

<A COMPOSING BLOCK 4Cb (A COMPOSING MEANS)>

(4Cb-1) An operation of 'J=I+1 (MOD N)' is executed to obtain an integer J proceeding the count variable I by 1.

(4Cb-2) The composite value V of the composing block 4Cb is computed by combining linearly a set of N memorized values M(J-nL (MOD NL)) (n=1, 2, ..., N) with positive coefficients Wn (n=1, 2, ..., N) from n=1 to n=N, where the N memorized values M(J-nL (MOD NL)) (n=1, 2, ..., N) have been renewed at intervals of L renewing cycles. That is, $$V = \sum_{n=1}^{N} Wn \cdot M(J - nL(MOD\ NL)) \quad (1)$$

where $$\sum_{n=1}^{N} Wn = 1 \quad (3)$$

Preferably, $$Wn = 1/N(n = 1, 2, \ldots, N) \quad (4)$$

so as to make the computation of the composite value V easier. Notice that the composite value V of Eq. (1), computed here, will be used in the output block 3B and the renewing block 3Ca at the next detecting timing. So, the composing block 3Cb computes the composite value V for future use, and the count variable I at the next detected timing will be equal to J at this timing.

(A CHANGING BLOCK 4D (A CHANGING MEANS))

(4D-1) The detected signal Br which is obtained by the reel speed detector 14B is inputted and changed to the digital or coded value Ld. Ld is in inverse proportion to the rotational frequency of the detected reel 36.

(4D-2) A number L which is the basic number of a plurality of memorized values at the memorizing block 4C is changed to the digital or coded value Ld.

After the changing of L to Ld, the operation of the microprocessor 13A goes back to the task of the error block 4A.

The control system of the embodiment of the present invention shown by the combination of FIG. 2, FIG. 3 and FIG. 4 has a remarkably improved robustness to disturbances, which will be explained in detail hereinbelow.

As well as the control system described in the description of the prior art, the control system of the embodiment of the present invention has good improved robustness to torque disturbances, especially at the frequencies k*fe (k=0, 1, 2, ...), where $$fe = 1/(L \cdot Tx) \quad (5)$$

The control system of the embodiment of the present invention further has the following effect. According to the changing of L to the digital or coded value Ld which is in proportion to the rotational frequency of the detected reel, the number of the plurality of memorized values which are renewed sequentially and periodically at the memorizing block is changed, so that the frequency fe becomes substantially equal to the frequency corresponding to the speed of the detected reel. Therefore even if the tape tension of the magnetic tape 35 fluctuates because of the influence from the detected reel (the take-up reel 36a or the supply reel 36b), almost no fluctuation occurs in the rotating speed of the capstan motor 11A.

Furthermore, since the fluctuation of the tape tension is more influences by the take-up reel 36a than the supply reel 36b, it is better to select the take-up reel 36a than to select the supply reel 36b as the detected reel.

Figure 5:
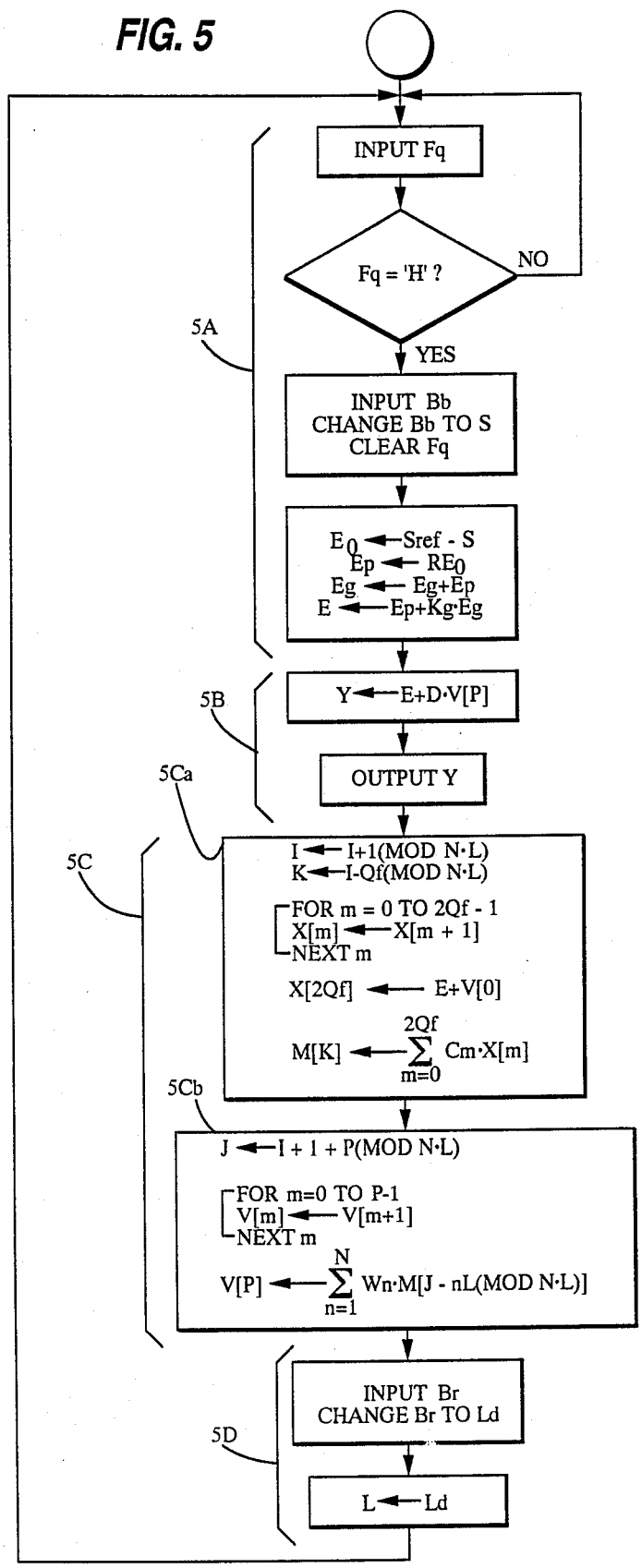
FIG. 5 is a control flow diagram of another embodiment of a control system according to the present invention, which is a combination of FIG. 2, FIG. 3 and FIG. 5.

FIG. 5 shows another flow diagram of the operation of the microprocessor 13A in the controlling block 13, which represents another embodiment of the present invention by the combination of FIG. 2, FIG. 3 and FIG. 5. The flow diagram of FIG. 5 will be explained hereinbelow.

(AN ERROR BLOCK 5A (AN ERROR MEANS))

(5A-1) The flag signal Fq is checked until the flag signal Fq becomes "H". That is, the microprocessor 13A is triggered so as to execute the following procedure at the timing when the speed detector 12B obtains a new detected code corresponding to the current speed of the capstan motor 11A.

(5A-2) The detected signal Bb (the held content of the counter 24) is inputted and changed to the digital or coded value S. Then, the contents of the counter 24 and the D-type flip-flop 25 are reset by making the reset signal Rr "H" for a very short time.

(5A-3) A difference value Eo is computed between the detected value S and a predetermined value Sref corresponding to the aimed speed. That is, Eo=Sref-S.

(5A-4) A proportional value Ep is obtained by multiplying the difference value Eo with a predetermined positive value R. That is, Ep=REo. An integral value Eg is obtained by adding its old value Eg and the proportional value Ep. That is, Eg=Eg+Ep. An error signal E is computed by mixing the proportional value Ep and the integral value Eg with a ratio of 1:Kg, where Kg is a positive constant. That is, E=Ep+KgEg. Thus, the error block 5A includes a proportional-integral filter means so that the error signal E has not only the proportional part but also the integral part of the difference value Eo.

(AN OUTPUT BLOCK 5B (AN OUTPUT MEANS))

(5B-1) An output signal Y is obtained by mixing the error signal E and a composite value V(P) of a composing block 5Cb in a memorizing block 5C, described later, with a ratio of 1:D, where D is a positive real at most equal to 1.5 and at least equal to 0.25

(5B-2) The output signal Y is outputted to the D/A converter 13C as the control signal Cs.

(A MEMORIZING BLOCK 5C (A MEMORIZING MEANS))

The memorizing block 5C comprises a renewing block 5Ca and the composing block 5Cb.

<A RENEWING BLOCK 5Ca (A RENEWING MEANS)>

(5Ca-1) A count variable I is incremented with a modulo number NL, where each of N and L is an integer at least equal to 2 and preferably L is equal to an integral multiple of Zq. That is, 'I=I+1 (MOD NL)' means 'I=I+1 and I=0 if I=NL'. Thus, the count variable I varies from 0 to NL−1 and increments its value in a circular form at every detecting timing of the speed detector 12B.

(5Ca-2) An integer K is computed by subtracting an integer Qf from the count variable I with the modulo number NL, where Qf is an integer at least equal to 2 and preferably Qf=3.

(5Ca-3) A set of registers X(m) (m=0, 1, 2, ..., 2Qf) are used to compute a renewing value. The content of the register X(m+1) is transferred to the register X(m) sequentially from m=0 to m=2Qf−1. The content of the register X(2Qf) is changed by a mixed value of the error signal E of the error block 5A and a composite value V(0) of the composing block 5Cb with a ratio of 1:1. That is, X(2Qf)=E+V(0). As the result of this, 2Qf+1 of the mixed values (E+V(0)), sequential with respect to the timings obtained, are stored in those registers X(m) (m=0, 1, 2, ..., 2Qf).

(5Ca-4) A memorized value M(K), stored at the address corresponding to the integer K in the RAM of the memory 13B, is renewed by a linear combination of the mixed values stored in the registers X(m) (m=0, 1, 2, ..., 2Qf) with positive coefficients Cm (m=0, 1, 2, ..., 2Qf). That is, $$M(K) = \sum_{m=0}^{2Qf} Cm \cdot X(m) \quad (6)$$

where the coefficients Cm have the following relationships:

$$C_m = C_{2Qf-m} \ (m = 0, 1, \ldots, Qf) \quad (7)$$

$$\sum_{m=0}^{2Qf} Cm = 1 \quad (8)$$

The renewed memorized value M(K) is held until the next renewing time of M(K), that is, NL renewing cycles later. As the result of this, the NL mmorized values M(0) to M(NL−1) are obtained, and the NL memorized values are sequentially and periodically renewed.

<A COMPOSING BLOCK 5Cb (A COMPOSING MEANS)>

(5Cb-1) An operation of 'J=I+1+P (MOD NL)' is executed to obtain an integer J proceeding the count variable I by P+1, where P is an integer at most equal to 5 and at least equal to 1, and preferably P=3.

(5Cb-2) Another set of registers V(m) (m=0, 1, ..., P) are used to store composite values. The content of the register V(m+1) is transferred to the register V(m) from m=0 to m=P−1.

(5Cb-3) The newest composite value V(P) is computed by combining linearly a set of N memorized values M(J-nL (MOD NL)) (n=1, 2, ..., N) with positive coefficients Wn (n=1, 2, ..., N) from n=1 to n=N, where the N memorized values M(J-nL (MOD NL)) (n=1, 2, ..., N) have been renewed at intervals of L renewing cycles. That is, $$V(P) = \sum_{n=1}^{N} Wn \cdot M(J - nL(MOD\ NL)) \quad (9)$$

where the coefficients Wn (n=1, 2, ..., N) have the same relationships of Eq. (2) to Eq. (4). As the result of this, a plurality of the composite values V(m) (m=0, 1, ..., P), sequential with respect to the timings, are obtained. Notice that V(0) is the oldest composite value for using in the renewing block 5Ca at the next renewing timing, V(P) is the newest coposite value for using in the output block 5B at the next timing, and V(P) and V(0) have an interval of P periods. So, the composing block 5Cb computes the composite values V(m) (m=0, 1, ..., P) for future use.

(A CHANGING BLOCK 5D (A CHANGING MEANS))

(5D-1) The detected signal Br which is obtained by the reel speed detector 14B is inputted and changed to the digital or coded value Ld, which is in inverse proportion to the rotational frequency of the detected reel 36. (5D-2) A number L which is the basic number of a plurality of memorized values at the memorizing block 5C is changed to the digital or coded value Ld.

After the changing of L to Ld, the operation of the microprocessor 13A goes back to the task of the error block 5A.

Figure 4:
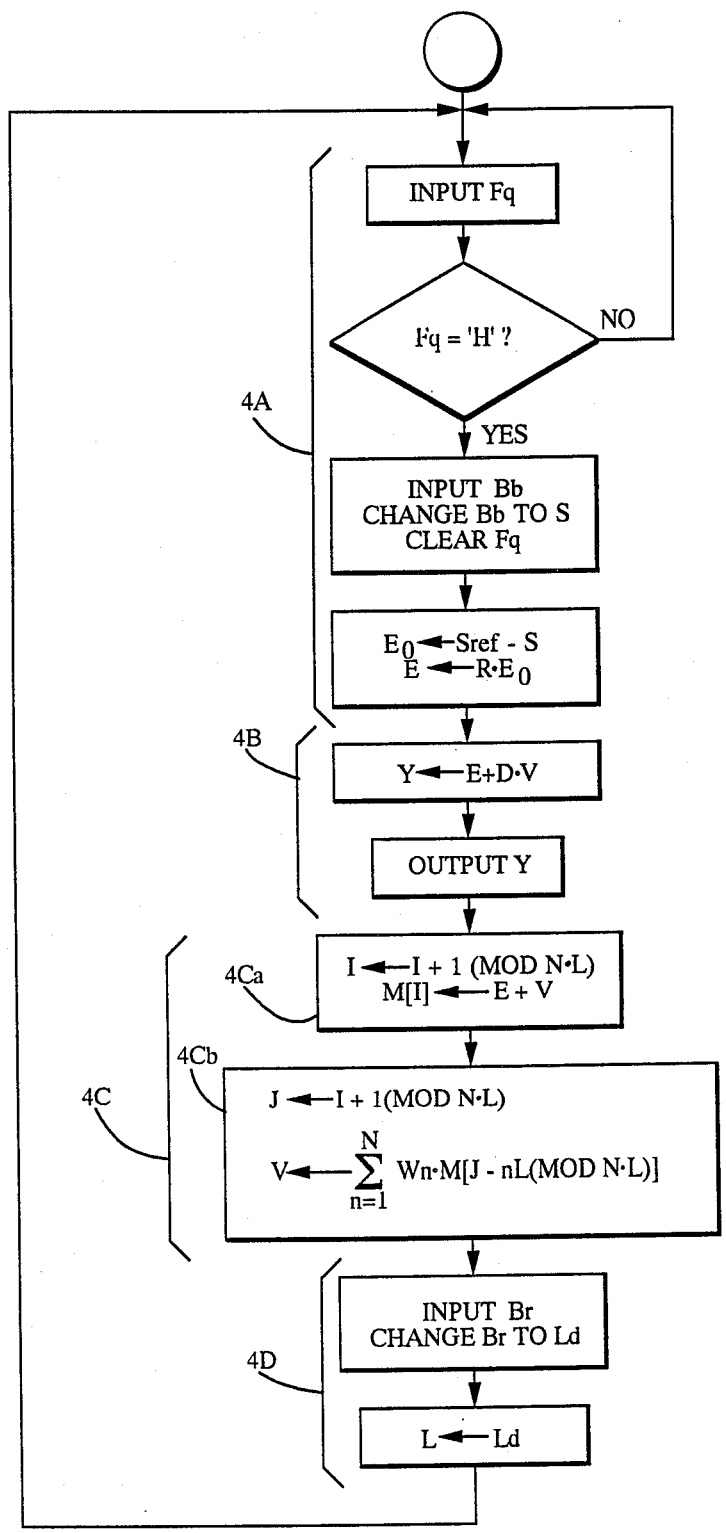
FIG. 4 is a control flow diagram of an embodiment of a control system according to the present invention, which is a combination of FIG. 2, FIG. 3 and FIG. 4.

The embodiment of the present invention by the combination of FIG. 2, FIG. 3 and FIG. 5 further has the following advantages:

(1) The robustness to disturbances of this embodiment is more improved than that of the embodiment shown by the combination of FIG. 2, FIG. 3 and FIG. 4, because the error block 5A includes the proportional-integral filter means.

(2) The control system of this embodiment has successfully stabilized even if the error block 5A includes the proportional-integral filter means, for the sake of the improvements of the renewing block 5Ca and the composing block 5Cb.

Figure 6:
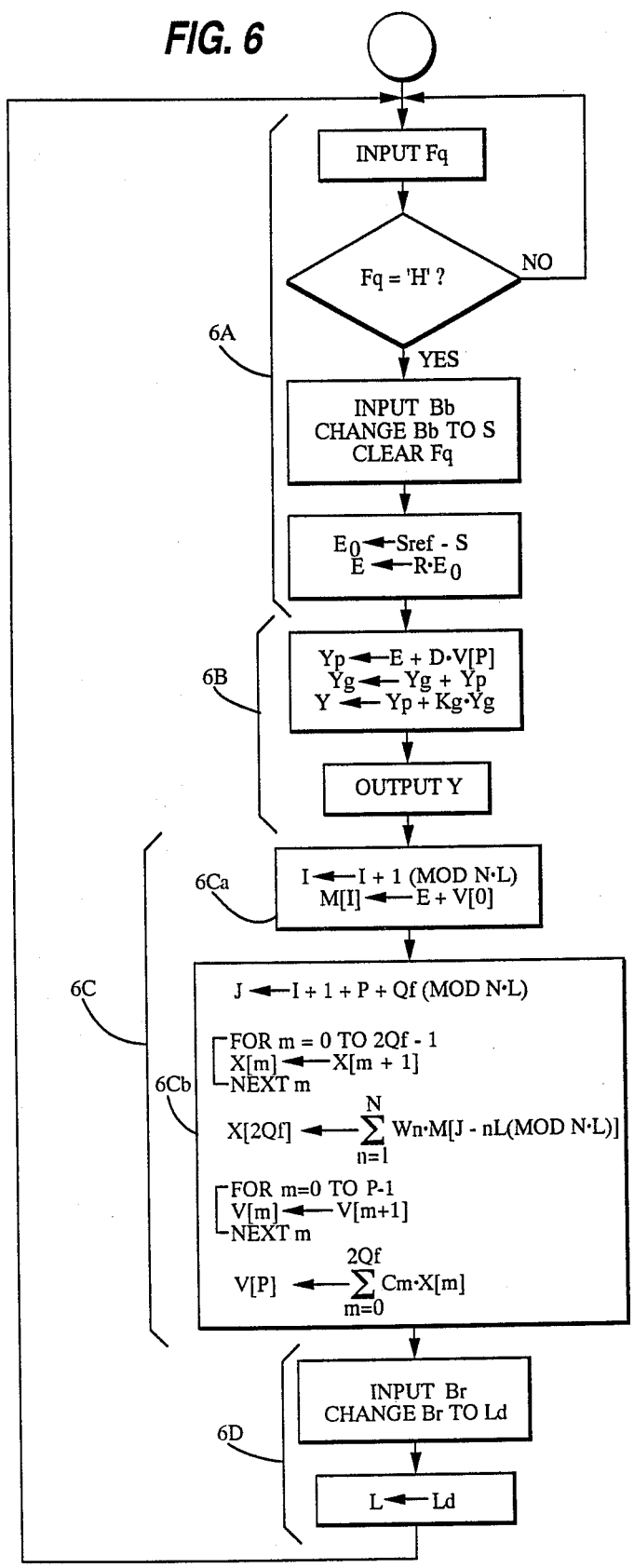
FIG. 6 is a control flow diagram of still another embodiment of a control system according to the present invention, which is a combination of FIG. 2, FIG. 3 and FIG. 6.

FIG. 6 shows still another flow diagram of the operation of the microprocessor 13A in the controlling block 13, which represents still another embodiment of the present invention by the combination of FIG. 2, FIG. 3 and FIG. 6. The flow diagram of FIG. 6 is explained hereinbelow.

(AN ERROR BLOCK 6A (AN ERROR MEANS))

(6A-1) The flag signal Fq is checked until the flag signal Fq becomes "H". That is, the microprocessor 13A is triggered so as to execute the following procedure at the timing when the speed detector 12B obtains a new detected code corresponding to the current speed of the capstan motor 11A.

(6A-2) The detected signal Bb (the held content of the counter 24) is inputted and changed to the digital or coded value S. Then, the contents of the counter 24 and the D-type flip-flop 25 are reset by making the reset signal Rr "H" for a very short time.

(6A-3) A difference value Eo is computed between the detected value S and a predetermined value Sref correponding to the aimed speed. That is, Eo=Sref-S. Then, an error signal E is obtained by multiplying the difference value Eo with a predetermined positive value R. That is, E=REo. (AN OUTPUT BLOCK 6B (AN OUTPUT MEANS))

(6B-1) A proportional value Yp is obtained by mixing the error signal E and a composite value V(P) of a composing block 6Cb in a memorizing block 6C, described later, with a ratio of 1:D, where D is a positive real, at most equal to 1.5 and at least equal to 0.25. An integral value Yg is computed by adding its old value Yg and the proportional value Yp. That is, Yg=Yg+Yp. An output signal Y is computed by mixing the proportional value Yp and the integral value Yg with a ratio of 1:Kg, where Kg is a positive constant. That is, Y=Yp+KgYg.

(6B-2) The output signal Y is outputted to the D/A converter 13C as the control signal Cs. Thus, the output block 6B includes a proportional-integral filter means so that the output signal Y has not only the proportional part but also the integral part of the mixed value (E+DV(P)).

(A MEMORIZING BLOCK 6C (A MEMORIZING MEANS))

The memorizing block 6C comprises a renewing block 6Ca and the composing block 6Cb.

<A RENEWING BLOCK 6Ca (A RENEWING MEANS)>

(6Ca-1) A count variable I is incremented with a modulo number NL, where each of N and L is an integer at least equal to 2 and preferably L is equal to an integral multiple of Zq. That is, 'I=I+1 (MOD NL)' means 'I=I+1 and I=0 if I=NL'. Thus, the count variable I varies from 0 to NL−1 and increments its value in a circular form at every detecting timing of the speed detector 12B.

(6Ca-2) A memorized value M(I), stored at the address corresponding to the count variable I in the RAM of the memory 13B, is renewed by a mixed value of the error signal E and a composite value V(0) of the composing block 6Cb with a ratio of 1:1. That is, M(I)=E+V(0). The renewed memorized value M(I) is held until the next renewing time of M(I), that is, NL renewing cycles later. As the result of this, the NL memorized values M(0) to M(NL−1) are obtained, and the NL memorized values are sequentially and periodically renewed.

<A COMPOSING BLOCK 6Cb (A COMPOSING MEANS)>

(6Cb-1) An operation of 'J=I+1+P+Qf (MOD NL)' is executed to obtain an integer J proceeding the count variable I by P+Qf+1 is obtained, where P is an integer at most equal to 5 and at least equal to 1 and preferably P=3, and Qf is an integer at least equal to 2 and preferably Qf=3.

(6Cb-2) A set of registers X(m) (m=0, 1, 2, ..., 2Qf) are used to compute composite values. The content of the register X(m+1) is transferred to the register X(m) sequentially from m=0 to m=2Qf−1.

(6Cb-3) The content of the register X(2Qf) is changed by a linear combination of a set of N memorized values M(J-nL (MOD NL)) (n=1, 2, ..., N) with positive coefficients Wn (n=1, 2, ..., N) from n=1 to n=N, where the N memorized values M(J-nL (MOD NL)) (n=1, 2, ..., N) have been renewed at intervals of L renewing cycles. That is, $$X(2Qf) = \sum_{n=1}^{N} Wn \cdot M(j - nL(MOD\ NL)) \tag{10}$$

where the coefficients Wn (n=1, 2, ..., N) have the same relationships of Eq. (2) to Eq. (4). As the result of this, a plurality of linear combinations X(m) (m=0, 1, ..., 2Qf), sequential with respect to the timings, are obtained.

(6Cb-4) Another set of registers V(m) (m=0, 1, ..., P) are used to store composite values. The content of the register V(m+1) is transferred to the register V(m) from m=0 to m=P−1.

(6Cb-5) The newest composite value V(P) of the composing block 8Cb is computed by combining linearly the linear combinations X(m) (m=0, 1, 2, ..., 2Qf) with positive coefficients Cm (m=0, 1, 2, ..., 2Qf). That is, $$V(P) = \sum_{m=1}^{2Qf} Cm \cdot X(m) \tag{11}$$

where the coefficients Cm have the relationships of Eq. (7) and Eq. (8). As the result of this, a plurality of composite values V(m) (m=0, 1, ..., P), sequential with respect to the timings, are obtained. Notice that V(0) is the oldest composite value for using in the renewing block 8Ca at the next renewing timing, V(P) is the newest composite value for using in the output block 6B at the next timing, and V(P) and V(0) have an interval of P periods. So, the composing block 6Cb computes the composite values V(m) (m=0, 1, ..., P) for future use.

(A CHANGING BLOCK 6D (A CHANGING MEANS))

(6D-1) The detected signal Br which is obtained by the reel speed detector 14B is inputted and changed to the digital or coded value Ld, which is in inverse proportion to the rotational frequency of the detected reel 36.

(6D-2) A number L which is the basic number of a plurality of memorized values at the memorizing block 6C is changed to the digital or coded value Ld.

After the changing of L to Ld, the operation of the mircorpocessor 13A goes back to the task of the error block 6A.

The embodiment of the present invention by the combination of FIG. 2, FIG. 2 and FIG. 6 also has the following advantages:

(1) The robustness to disturbances of this embodiment is more improved than that of the embodiment shown by the combination of FIG. 2, FIG. 3 and FIG. 4, because the output block 6B includes the proportional-integral filter means.

(2) The control system of this embodiment has successfully stabilized even if the output block 6B includes the proportional-integral filter means, for the sake of the improvement of the composing block 6Cb.

In each of the above embodiments according to the present invention, it is very advantageous for improving the robustness to disturbances that the microprocessor 13a executes the task of the memorizing block and the changing block in the reset time after finishing the tasks of the error block and the output block, because a computing time delay for obtaining a new value of the control signal with a new value of the detected signal can be minimized. The computing time delay is the essential factor to determine an overall control gain, and smaller computing time delay makes the overall control gain larger. In particular, it is ver important for minimizing the computing time delay that the composing block in the memorizing block prepares one or more composite values for future use. Notice also that it is not so important to minimize a computing time for the task of the memorizing block, because the memorizing block can use the rest time of the one detecting period except the computing time delay for the tasks of the error block and the output block.

Specific embodiments of the present invention have been described hereinabove with reference to the accompanying drawngs, but it should be understood that the invention is not limited to those specific embodiments, and that various changes and modifications may be effected by one skilled in the art without departing from the scope or spirit of the invention as defined in the appended claims. For example, the error signal can be a signal composed with a speed error and a phase error of a capstan motor so as to control not only the speed but also the phase of the capstan motor, when the control system for a capstan motor has a phase detector as well as a speed detector.

What is claimed is:

1. A control system comprising:

a first detecting means for detecting a controlled variable of a controlled system periodically at intervals of a detection period and for producing at each detection timing a first detected signal indicative of each detected controlled variable;

a second detecting means for detecting a period of a periodic fluctuation of a disturbance source disturbing the controlled system and for producing a second detected signal proportional to the period of the periodic fluctuation;

an error value producing means for producing from the first detected signal an error value indicative of an error of the controlled variable;

a memory have stored therein a plurality of stored values;

a renewing means for mixing the error value with a composite value which is produced from at least one of the plurality of stored values for obtaining a renewing value and for renewing each of the plurality of stored values sequentially and periodically by the renewing value at intervals of a renewing period proportional to the detection period of said first detecting means;

a composing means for producing the composite value at each renewing timing of said renewing means from at least one of the plurality of stored vales which have been previously renewed by at least L renewing periods, wherein L is an integer which is at least equal to 2;

an output means for mixing the error value with the composite value at a predetermined mixing ratio to obtain a control signal and for supplying the controlled system with the control signal to control the controlled variable; and a changing means responsive to the second detected signal for controlling the composing means so as to change the value of L in proportion to the second detected signal thereby reducing an influence of the fluctuation of the disturbance source on the controlled variable.

2. A control system as claimed in claim 1, wherein said control system has a microprocessor for executing tasks of said error producing means, renewing means, composing means, output means and changing means, and wherein said microprocessor executes the tasks of said renewing means, composing means and changing means within a period of time after finishing execution of the tasks of said error producing means and said output means and before starting a next execution of the tasks of said error producing means and said output means.

3. A control system as claimed in claim 1, wherein said error producing means includes a proportional-integral filter means for causing said error value to include both a proportional part and also an integral part of said first detected signal.

4. A control system as claimed in claim 1, wherein said output means includes a proportional-integral filter means for causing said control signal to include both a proportional part and also an integral part of a mixed value of said error value and said composite value.

5. A control system as claimed in claim 1, wherein said composite value produced by said composing means includes at least a linear combination of N stored values in the memory which have been previously renewed by at least L renewing periods, wherein N is an integer which is at least equal to 2.

6. A control system as claimed in claim 5, wherein said N stored values are arranged to be sequential with respect to the timings renewed.

7. A control system as claimed in claim 5, wherein said composing means produces said linear combination of N stored values so as to have coefficients having a same sign.

8. A control system as claimed in claim 7, wherein all of said coefficients are produced so as to be substantially equal in value.

9. A control system for controlling a motor comprising:
a speed detecting means for detecting a speed of the motor periodically at intervals of a detection period and for producing at each detection timing a first detected signal indicative of each detected speed of the motor;
a fluctuation detecting means for detecting a period of a periodic fluctuation of a torque disturbance source disturbing a torque of the motor and for producing a second detected signal proportional to the period of the periodic fluctuation;
an error producing means for producing from said first detected signal an error value indicative of an error in the speed of the motor;
a memory having stored therein a plurality of stored values;
a renewing means for mixing said error value with a composite value which is produced from at least one of the plurality of stored values to obtain a renewing value and for renewing each of the plurality of stored values sequentially and periodically by the renewing value at intervals of a renewing period proportional to the detection period of said speed detecting means;
a composing means for producing the composite value at each renewing timing of said renewing means from at least one of the plurality of stored values which have been previously renewed by at least L renewing periods, wherein L is an integer at least equal to 2;
an output means for mixing the error value with the composite value at a predetermined mixing ratio to obtain a control signal;
a driving means responsive to the control signal for driving the motor; and
a changing means responsive to the second detected signal for controlling the composing means so as to change the value of L in proportion to the second detected signal thereby reducing an influence of the fluctuation of the torque disturbance source on the torque of the motor.

10. A control system as claimed in claim 9, wherein said control system has a microprocessor for executing tasks of said error producing means, renewing means, composing means, output means and changing means, and wherein said microprocessor executes the tasks of said renewing means, composing means, and changing means within a period of time fater finishing execution of the tasks of said error producing means and said output means and before starting a next execution of the task of said error producing means and said output means.

11. A control system as claimed in claim 9, wherein said error producing means includes a proportional-integral filter means for causing said error value to include both a proportional part and also an integral part of said first detected signal.

12. A control system as claimed in claim 9, wherein said output means includes a proportional-integral filter means for causing said control signal to include both a proportional part and also an integral part of a mixed value of said error value and said composite value.

13. A control system as claimed in claim 9, wherein said composite value produced by said composing means includes at least a linear combination of N stored values in the memory which have been previously renewed by at least L renewing periods, wherein N is an integer which is at least equal to 2.

14. A control system as claimed in claim 13, wherein said N stored values are arranged to be sequential with respect to the timings they have renewed.

15. A control system as claimed in claim 13, wherein said composing means produces said linear combination of N stored values so as to have coefficients having a same sign.

16. A control system as claimed in claim 15, wherein all of said coefficients are produced so as to be substantially equal in value.

17. A control system for controlling a capstan motor for moving a recording tape wound on a pair of supply and take-up reels in a tape recorder, said control system comprising:
a speed detecting means for detecting a speed of the capstan motor periodically at intervals of a detection period and for producing at each detection timing a first detected signal indicative of each detected speed of the motor;
a fluctuation detecting means for detecting a rotation period of one of the reels causing a tape tension fluctuation disturbing a torque of the motor and for producing a second detected signal proportional to the rotation period;
an error producing means for producing from said first detected signal an error value indicative of an error in the speed of the motor;
a memory have stored therein a plurality of stored values;
a renewing means for mixing said error value with a composite value which is produced from at least one of the plurality of stored values to obtain a renewing value and for renewing each of the plurality of stored values sequentially and periodically by the renewing value at intervals of a renewing period proportional to the detection period of said speed detecting means;
a composing means for producing the composite value at each renewing timing of said renewing means from at least one of the plurality of stored values which have been previously renewed by at least L renewing periods, wherein L is an integer which is at least equal to 2;
an output means for mixing the error value with the composite value at a predetermined mixing ratio to obtain a control signal;
a driving means responsive to the control signal for driving the motor; and
a changing means responsive to the second detected signal for controlling the composing means so as to change the value of L in proportion to the second detected signal thereby reducing an influence of the tape tension fluctuation on the torque of the motor.

18. A control system as claimed in claim 17, wherein said control system has a microprocessor for executing tasks of said error producing means, renewing means, composing means, output means and changing means, and wherein said microprocessor executed thes tasks of said renewing means, composing means and changing means within a period of time after finishing execution of the tasks of said error producing means and said output means and before starting a next execution of the tasks of said error producing means and said output means.

19. A control system as claimed in claim 17, wherein said error producing means includes a proportional-integral filter means for causing said error value to include both a proportional part and also an integral part of said first detected signal.

20. A control system as claimed in claim 17, wherein said output means includes a proportional-integral filter means for causing said control signal to include both a proportional part and also an integral part of a mixed value of said error value and said composite value.

21. A control system as claimed in claim 17, wherein said composite value produced by said composing means includes at least a linear combination of N stored values in the memory which have been previously renewed by at least L renewing periods, wherein N is an integer which is at least equal to 2.

22. A control system as claimed in claim 21, wherein said N stored values are arranged to be sequential with respect to the timings they have renewed.

23. A control system as claimed in claim 21, wherein said composing means produces said linear combination of N stored value so as to have coefficients having a same sign.

24. A control system as claimed in claim 23, wherein all of said coefficients are produced so as to be substantially equal in value.

* * * * *